(12) United States Patent
Ting et al.

(10) Patent No.: US 6,825,901 B2
(45) Date of Patent: Nov. 30, 2004

(54) MULTI-DIRECTIONAL DIFFUSION-SYMMETRIC SLANT REFLECTOR

(75) Inventors: Dai-Liang Ting, Hsinchu (TW); Wei-Chih Chang, Hsinchu Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/453,084

(22) Filed: Jun. 2, 2003

(65) Prior Publication Data

US 2003/0206258 A1 Nov. 6, 2003

Related U.S. Application Data

(62) Division of application No. 09/849,132, filed on May 4, 2001.

(51) Int. Cl.[7] ............................................. G02F 1/1335
(52) U.S. Cl. ..................... 349/113; 349/112; 349/144; 359/485
(58) Field of Search ................................ 349/112, 113, 349/129, 144; 359/485

(56) References Cited

U.S. PATENT DOCUMENTS 5,914,825 A * 6/1999 Nishio et al. ............... 359/851
5,917,570 A * 6/1999 Bryan-Brown et al. ..... 349/129

\* cited by examiner

Primary Examiner—Tarifur R. Chowdhury
Assistant Examiner—P. R. Akkapeddi
(74) Attorney, Agent, or Firm—J.C. Patents

(57) ABSTRACT

A multi-directional diffusion-symmetric slant reflector. A substrate having a plurality of domains thereon is provided. A plurality of diffusion-symmetric slant reflectors are formed on the substrate. The diffusion-symmetric slant reflectors has a variety of shapes, including conical, elliptical cone longitudinal prismatic or other polyhedron shapes. A plurality of bumps, such as cone, elliptical cone or longitudinal prism structures, are formed on the slant surface of the diffusion-symmetric slant reflectors. The longitudinal prismatic and elliptical cone diffusion-symmetric slant reflectors within a domain are aligned to a direction. An reflection layer such as an aluminum layer, a silver layer or a layer made of materials with a characteristic of reflection, is formed over the surface of the diffusion-symmetric slant reflector. A method of forming a diffusion-symmetric slant reflector is also provided. A substrate is provided and then a photoresist layer is formed over the substrate. After the substrate and the photoresist layer assembly are baked, a photolithographic process is conducted using a gray-level mask, a multi-step exposure process or a half-tone mask. The exposed photoresist layer is developed, followed by an intermediate baking and a hard baking. In the final step, aluminum is deposited over the photoresist layer.

11 Claims, 3 Drawing Sheets

MULTI-DIRECTIONAL DIFFUSION-SYMMETRIC SLANT REFLECTOR

CROSS-REFERENCE TO RELATED APPLICATION

This application is a divisional application of, and claims the priority benefit of, U.S. application Ser. No. 09/849,132 filed on May 4, 2001.

BACKGROUND OF THE INVENTION

1. Field of Invention

The present invention relates to a liquid crystal display. More particularly, the present invention relates to a multi-directional diffusion-symmetric slant reflector (DSSR).

2. Description of Related Art

Liquid crystal displays (LCD) consume very little power in addition to being light and thin. Therefore, a LCD is incorporated into most mobile information processing equipment. To reserve battery power in the mobile equipment, the LCD must consume as little power as possible. Because a conventional transmissive type of LCD requires a backlight, a large amount of the battery power is used just to illuminate the LCD panel. A reflective type of LCD utilizes surrounding light and hence has very low power consumption. Hence, a reflection LCD is highly suitable for mobile equipment.

FIG. 1 is a schematic cross-sectional view showing a conventional reflective type of LCD. As shown in FIG. 1, the LCD has a planar reflector composed of an upper panel 102 and a lower panel 100. Light 104 coming from one side is reflected by the planar reflector. Notice that after reflecting from the planar reflector, the direction having the brightest reflection amongst the diffused rays 106 coincides with the direction of the normal reflection of the light ray 104 on a planar mirror. That is, the reflected light ray 108 having peak intensity is in a direction symmetrical to the incoming light ray 104. Because the peak intensity is not in the observer's direction 110, the brightness level of the surrounding light is not fully utilized.

FIG. 2 is a schematic cross-sectional view of another conventional reflective type of LCD. In FIG. 2, an asymmetric slant reflector 112 is used. Light 104 coming from one side is reflected by the asymmetric slant reflector 112. Although this design can align the brightest portion of the reflection with the observer's viewing direction 110, the asymmetric design of the reflector often leads to a variation of light intensity according to the viewing angle.

In yet another conventional reflective type of LCD, bump structures are formed on the surface of the reflector. Although the bumps are able to smooth out the non-uniformity of light intensity according to the viewing direction, the brightest portion of the reflected light also is not aligned with the observer's viewing direction. Consequently, the surrounding light is not fully utilized, similar to a conventional planar reflector.

SUMMARY OF THE INVENTION

The present invention is provides a multi-directional diffusion-symmetric slant reflector (DSSR). The DSSR is capable of guiding the brightest portion of reflected light toward the viewing direction of the observer. The multi-directional diffusion-symmetric slant reflector is capable of smoothing out light intensity across a wide range of viewing angles. Furthermore, a method of forming a multi-direction diffusion-symmetric slant reflector compatible with current manufacturing practices is provided.

To achieve these and other advantages and in accordance with the purpose of the invention, as embodied and broadly described herein, the invention provides a multidirectional diffusion-symmetric slant reflector. A substrate having a plurality of domains thereon is provided. A plurality of diffusion-symmetric slant reflectors is formed on the substrate. The diffusion-symmetric slant reflectors can have a variety of shapes including cone, elliptical cone, longitudinal prism or other polyhedron shapes. In addition, a plurality of bumps, such as cone, elliptical cone, longitudinal prism structures, are formed on the slant surface of the diffusion-symmetric slant reflectors. The longitudinal prismatic and elliptical cone diffusion-symmetric slant reflectors within a domain of the substrate are aligned to a direction particular to that domain. An reflection layer such as an aluminum layer, a silver layer or a layer made of materials with a characteristic of reflection, is formed over the surface of the diffusion-symmetric slant reflector.

The invention also provides a method of forming a diffusion-symmetric slant reflector. A substrate is provided, and then a photoresist layer is formed over the substrate. After the substrate and photoresist layer assembly are baked, a photolithographic process is conducted using a gray-level mask, a multi-step exposure process or a half-tone mask. The exposed photoresist layer is developed, followed by an intermediate baking and a hard baking. In the final step, aluminum is deposited over the photoresist layer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
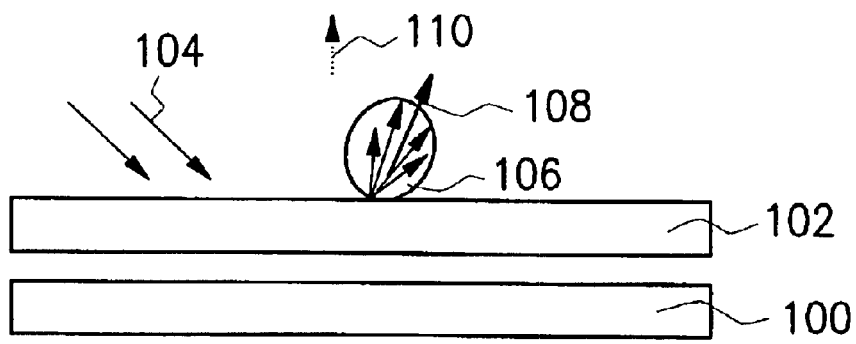
FIG. 1 is a schematic cross-sectional view showing a conventional reflective type of LCD.
Figure 2:
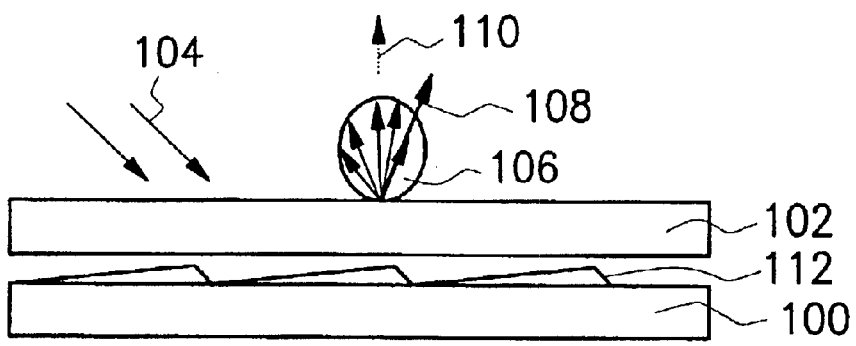
FIG. 2 is a schematic cross-sectional view of another conventional reflective type of LCD.

Reference will now be made in detail to the present preferred embodiments of the invention, examples of which are illustrated in the accompanying drawings. Wherever possible, the same reference numbers are used in the drawings and the description to refer to the same or like parts.

In this invention, multi-directional diffusion-symmetric slant reflectors are formed on a substrate to be used in a reflective type of liquid crystal display.

Figure 3:
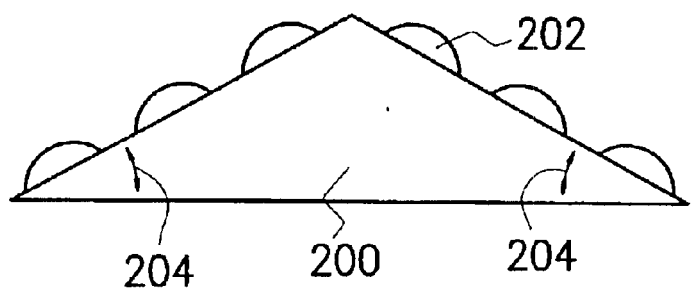
FIG. 3 is a schematic cross-sectional view of a diffusion-symmetric slant reflector according to this invention.

FIG. 3 is a schematic cross-sectional view of a diffusion-symmetric slant reflector according to this invention. The diffusion-symmetric slant reflector is made from a photoresist material 200. The reflector has two symmetrical slant faces. The slant angle 204 is bounded by the slant face and the base edge and is about 3° to 10°, preferably 4° to 5°, so that the brightest portion of the reflected light is deflected toward the viewer. A plurality of bumps 202 are formed on the slant surfaces. The bumps 202 serve to smooth out brightness level variation according to the viewing direction.

To ensure no predominant direction of reflection in a reflective type of LCD, the slant surfaces of the diffusion-symmetric slant reflectors must be designed with some form of symmetry so that the reflected light is multi-directional. Symmetry can be achieved if the reflector has a conical surface (shown in FIG. 4), an elliptical cone surface (shown in FIG. 5) or a longitudinal prismatic surface (shown in FIG. 6).

Figure 4:
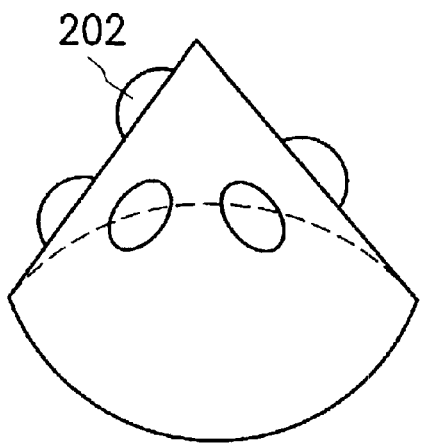
FIG. 4 is a perspective view of a conical shape diffusion-symmetric slant reflector according to this invention.

FIG. 4 is a perspective view of a conical shape diffusion-symmetric slant reflector according to this invention. As shown in FIG. 4, the conical shaped diffusion-symmetric slant reflector has a circular base. Due to the symmetrical slant surface, a uniform light intensity is obtained regardless of the viewing angle.

Figure 5:
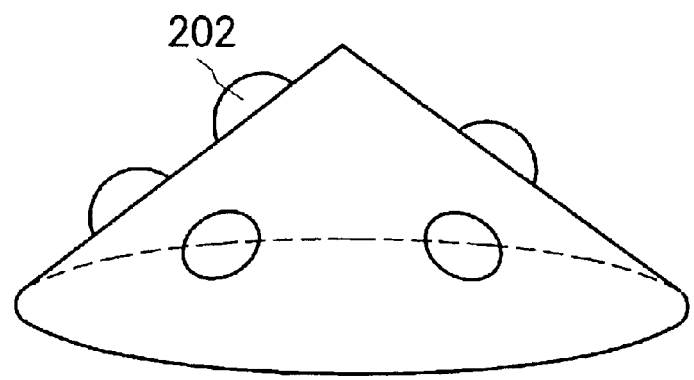
FIG. 5 is a perspective view of an elliptical cone shape diffusion-symmetric slant reflector according to this invention.

FIG. 5 is a perspective view of an elliptical cone shape diffusion-symmetric slant reflector according to this invention. As shown in FIG. 5, the elliptical cone shaped diffusion-symmetric slant reflector has an elliptical base having a major and a minor axis.

Figure 6:
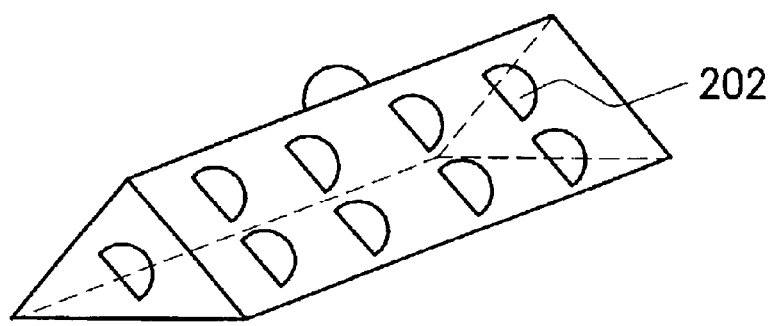
FIG. 6 is a perspective view of a longitudinal prismatic shape diffusion-symmetric slant reflector according to this invention.

FIG. 6 is a perspective view of a longitudinal prismatic shape diffusion-symmetric slant reflector according to this invention. As shown in FIG. 6, the longitudinal prismatic shape diffusion-symmetric slant reflector has a rectangular base.

Figure 7:
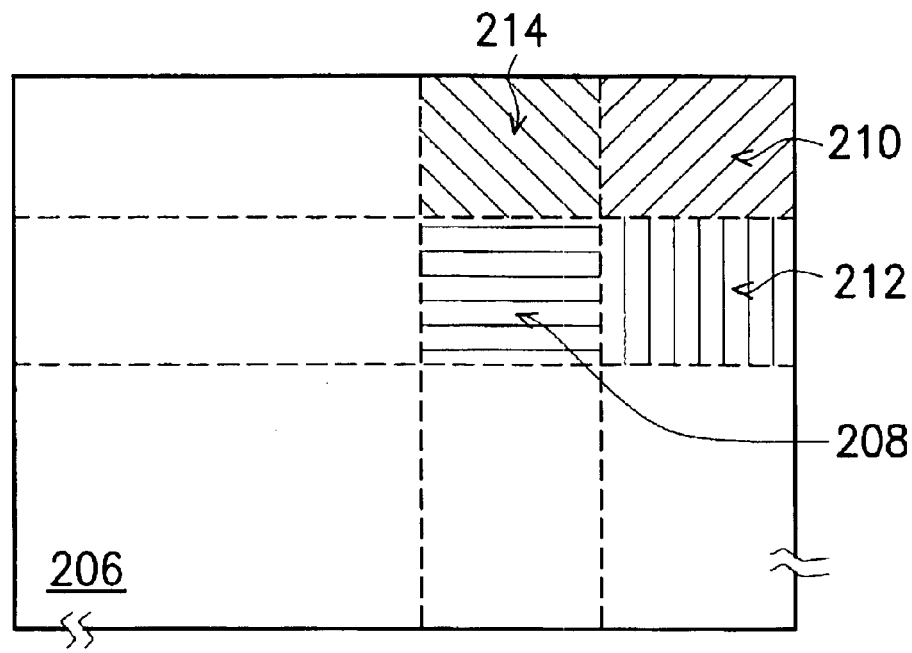
FIG. 7 is a top view showing the alignment of diffusion-symmetric slant reflectors in each domain of a multi-domain substrate.

FIG. 7 is a top view showing the alignment of diffusion-symmetric slant reflectors in each domain of a multi-domain substrate. As shown in FIG. 7, a single pixel can have a number of domains known as a multi-domain design. A substrate 206 is divided up into a plurality of domains. In each domain, a plurality of longitudinal prismatic shape, elliptical shape or conical shape diffusion-symmetric slant reflectors can be aligned in a specified direction. For example, domain 208 contains a plurality of horizontally aligned longitudinal prismatic diffusion-symmetric slant reflectors, defined to be at a 0° direction. Another domain 210 also contains a plurality of longitudinal prismatic diffusion-symmetric reflectors. However, all the reflectors in domain 210 are aligned at 45° to the horizontal. In yet another domain 212, all the longitudinal prismatic diffusion-symmetric reflectors are aligned at 90° to the horizontal. Finally, in domain 214, all the longitudinal prismatic diffusion-symmetric reflectors are aligned at −45° to the horizontal.

Figure 8:
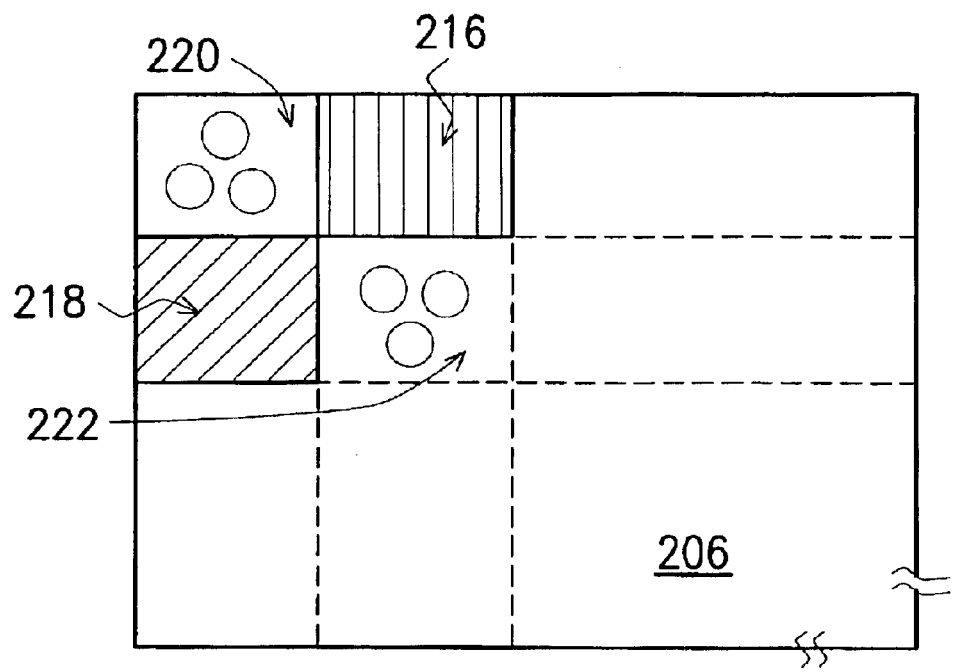
FIG. 8 is a top view showing the alignment of a mix of diffusion-symmetric slant reflectors on the domains of a multi-domain substrate.

FIG. 8 is a top view showing the alignment of a mix of diffusion-symmetric slant reflectors on the domains of a multi-domain substrate. As shown in FIG. 8, a substrate 206 is divided up into a plurality of domains like the one in FIG. 7. However, each domain may contain a different type of diffusion-symmetric slant reflector rather than using only one type of reflector in all the domains. For example, domain 216 contains a plurality of longitudinal prismatic diffusion-symmetric slant reflectors all aligned at 90° to the horizontal. In domain 218, longitudinal prismatic diffusion-symmetric slant reflectors are still used. The reflectors in domain 218 are aligned at 45° to the horizontal. However, in domains 220 and 222, conical shape diffusion-symmetric slant reflectors are used. In brief, by forming a multiple of domains in a pixel position, light intensity is homogenized regardless of the viewing direction.

This invention also provides a method for forming diffusion-symmetric slant reflectors on a substrate. First, a substrate is provided, and then a photoresist layer is coated over the substrate. The photoresist layer is baked and then a photolithographic process is carried out. After the photoresist layer is developed, an intermediate baking and a hard baking process are carried out in sequence so that slant surfaces with bumps as well as vias are formed at the same time. Lastly, an reflection layer such as an aluminum layer, a silver layer or a layer made of materials with a characteristic of reflection, is sputtered over the photoresist layer. The reflection layer serves as an electrode and a reflecting surface for light.

The photolithographic process can be conducted in three ways including the use of a gray-level mask, performing a multi-step exposure process, or the use of a half-tone mask. The gray-level mask is a mask containing regions that can be classified according to their degree of opacity. Hence, the photoresist layer will be subjected to different intensity levels in different regions when the photomask is used. Consequently, a photoresist layer having shapes of different depths can be obtained after development. However, a gray-level photomask is expensive to operate. In a multi-step exposure process, a different photomask is used in each photoresist exposure. After the photoresist layer is subjected to a few exposures, a photoresist layer having shapes of different depths can be obtained after development. However, a number of photomasks must be used and a number of exposures must be carried out. Therefore, multi-step exposure processes also are expensive to perform. On the other hand, in a half-tone masking process, dimensions of the opening are gradually modified so that the photoresist layer is able to receive different degrees of light intensity. After photoresist development, a photoresist layer having shapes of different depths can be obtained.

In the process of exposure and development, vias and symmetrical slant surfaces are formed concurrently. Hence, this invention uses the same number of exposures as a conventional method of forming the reflectors.

In summary, this invention provides multi-directional diffusion-symmetric slant reflectors having symmetrical slant surfaces so that the brightest portion of the reflected light is transferred toward the viewers. In addition, bumps are formed on the slant surfaces of the diffusion-symmetric slant reflectors, and the reflectors are designed symmetrically in the form of cone, elliptical cone or longitudinal prism shapes. Furthermore, the substrate is divided into a multiple of domains, each with a type of aligned reflector. All these measures will homogenize intensity of reflected light regardless of the viewing direction. Moreover, the vias and the slant surfaces are formed at the same time so that the number of exposures required for forming the reflectors is identical to a conventional process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-directional diffusion-symmetric slant reflector, comprising:
   - a substrate having a pixel thereon, wherein the pixel is divided into a plurality of domains;
   - a plurality of conical shape diffusion-symmetric slant reflectors on a first portion of the domains of the pixel;
   - a plurality of longitudinal prismatic shape diffusion-symmetric slant reflectors on a second portion of the domains of the pixel; and
   - a reflection layer over the diffusion-symmetric slant reflectors;
   - wherein the conical shape diffusion-symmetric slant reflector and the longitudinal prismatic diffusion-symmetric slant reflector both have a slant surface, and a plurality of bumps are formed on the slant surfaces, wherein the bumps are separated to each other by a distance.

2. The reflector of claim 1, wherein the angle between the slant surface and the substrate is about 3° to 10°.

3. The reflector of claim 1, wherein the slant surface of the conical shape diffusion-symmetric reflector forms a cone whose projection onto the substrate is a circle.

4. The reflector of claim 1, wherein the slant surface of the longitudinal prismatic diffusion-symmetric reflector includes a pair of symmetric slant surfaces, which has a rectangular shape in projection onto the substrate.

5. The reflector of claim 1, wherein directions of alignment of longitudinal prismatic diffusion-symmetric reflectors inside a domain are identical.

6. The reflector of claim 5, wherein the directions of alignment of longitudinal prismatic diffusion-symmetric reflectors in each domain are different or identical.

7. The reflector of claim 6, wherein the conical and longitudinal prismatic diffusion-symmetric reflectors are mixed in at least one domain.

8. The reflector of claim 1, wherein the longitudinal prismatic shape diffusion-symmetric reflectors are aligned with a direction different in each domain or mixed up in each domain.

9. The reflector of claim 1, wherein material forming the conical shape diffusion-symmetric reflector and the longitudinal prismatic diffusion-symmetric reflector includes photosensitive resin.

10. The reflector of claim 1, wherein the reflection layer includes a metal reflection layer.

11. The reflector of claim 10, wherein the reflection layer includes aluminum or silver.

* * * * *